（12）United States Patent
Steinbeck

(10) Patent No.: US 11,109,637 B2
(45) Date of Patent: Sep. 7, 2021

(54) CUSHIONING ARRANGEMENT FOR TEMPERATURE CONTROL OF A SOLE STRUCTURE

(71) Applicant: NIKE, Inc., Beaverton, OR (US)

(72) Inventor: Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 253 days.

(21) Appl. No.: 16/114,735

(22) Filed: Aug. 28, 2018

(65) Prior Publication Data

US 2019/0062614 A1 Feb. 28, 2019

Related U.S. Application Data

(60) Provisional application No. 62/552,964, filed on Aug. 31, 2017.

(51) Int. Cl.
*A43B 13/12* (2006.01)
*A43B 13/16* (2006.01)
(Continued)

(52) U.S. Cl.
CPC ............ *A43B 5/00* (2013.01); *A43B 7/34* (2013.01); *A43B 13/02* (2013.01); *A43B 13/12* (2013.01);
(Continued)

(58) Field of Classification Search
CPC ....... A43B 13/02; A43B 13/12; A43B 13/125; A43B 13/189; A43B 13/20; A43B 13/42;
(Continued)

(56) References Cited

U.S. PATENT DOCUMENTS 4,906,502 A * 3/1990 Rudy .................. A43B 13/20
428/69
5,543,194 A * 8/1996 Rudy .................. A43B 17/026
428/69
(Continued)

FOREIGN PATENT DOCUMENTS

KR 101366100 B1 2/2014
WO WO-2012125373 A2 * 9/2012 ........... B29D 35/122

OTHER PUBLICATIONS

International Searching Authority, International Search Report and Written Opinion for PCT Application No. PCT/US2018/048476, dated Dec. 10, 2018.
(Continued)

*Primary Examiner* — Jameson D Collier
(74) *Attorney, Agent, or Firm* — Honigman LLP; Matthew H. Szalach; Jonathan O'Brien

(57) ABSTRACT

A sole structure for an article of footwear includes a chamber having a first barrier element, a second barrier element, and a tensile member. The tensile member is disposed within an interior void defined by the first barrier element and the second barrier element. The sole structure further includes a phase change material disposed within the interior void and operable between a first state in a first temperature range and a second state in a second temperature range. The first temperature range is from 30° C. to 35° C. and the second temperature range is from 35° C. to 42° C. The sole structure further includes an insulating member disposed between the chamber and a ground contacting surface.

17 Claims, 5 Drawing Sheets

(51) Int. Cl.
*A43B 13/42* (2006.01)
*A43B 13/02* (2006.01)
*A43B 5/00* (2006.01)
*A43B 7/34* (2006.01)
*A43B 13/18* (2006.01)
*A43B 13/20* (2006.01)

(52) U.S. Cl.
CPC .......... *A43B 13/122* (2013.01); *A43B 13/125* (2013.01); *A43B 13/16* (2013.01); *A43B 13/189* (2013.01); *A43B 13/20* (2013.01); *A43B 13/42* (2013.01)

(58) Field of Classification Search
CPC ... A43B 3/0005; A43B 13/203; A43B 13/206; A43B 7/02; A43B 21/28
USPC ........... 36/29, 88, 28, 30 R, 30 A, 35 B, 153
See application file for complete search history.

(56) References Cited

U.S. PATENT DOCUMENTS

| | | | |
|---|---|---|---|
| 5,722,482 A | 3/1998 | Buckley | |
| 5,741,568 A * | 4/1998 | Rudy | A43B 7/141 428/69 |
| 6,205,682 B1 * | 3/2001 | Park | A43B 13/20 36/28 |
| 7,555,851 B2 * | 7/2009 | Hazenberg | A43B 13/125 36/102 |
| 2003/0124278 A1 * | 7/2003 | Clark | E04B 1/7662 428/35.7 |
| 2003/0124318 A1 * | 7/2003 | Magill | F28D 20/02 428/195.1 |
| 2004/0234726 A1 | 11/2004 | Pause et al. | |
| 2005/0039346 A1 * | 2/2005 | Thomas | A43B 13/20 36/29 |
| 2005/0183287 A1 * | 8/2005 | Schindler | A43B 13/20 36/29 |
| 2006/0254088 A1 * | 11/2006 | McCormick | A43B 7/34 36/44 |
| 2007/0051018 A1 | 3/2007 | Issler | |
| 2007/0063368 A1 | 3/2007 | Schindler | |
| 2008/0197126 A1 * | 8/2008 | Bourke | A43B 7/025 219/634 |
| 2008/0276490 A1 * | 11/2008 | Holt | A43B 17/03 36/28 |
| 2009/0288312 A1 * | 11/2009 | Dua | A43B 1/04 36/29 |
| 2009/0288313 A1 * | 11/2009 | Rapaport | B29C 65/02 36/29 |
| 2011/0131831 A1 * | 6/2011 | Peyton | A43B 13/18 36/29 |
| 2011/0271552 A1 * | 11/2011 | Peyton | A43B 13/20 36/29 |
| 2011/0277347 A1 * | 11/2011 | Monfils | A43B 13/189 36/29 |
| 2012/0102782 A1 * | 5/2012 | Swigart | A43B 13/185 36/83 |
| 2012/0233880 A1 * | 9/2012 | Chao | A43B 13/18 36/29 |
| 2014/0053427 A1 * | 2/2014 | Patton | A43B 13/189 36/29 |
| 2015/0106992 A1 * | 4/2015 | Blakely | A41D 13/0056 2/69 |
| 2015/0257483 A1 * | 9/2015 | Meschter | A43B 21/28 36/29 |
| 2018/0042139 A1 * | 2/2018 | Rosales | H05K 7/2029 |

OTHER PUBLICATIONS

European Patent Office (ISA), International Preliminary Report on Patentability for International Application No. PCT/US2018/048476, dated Mar. 12, 2020.

* cited by examiner

CUSHIONING ARRANGEMENT FOR TEMPERATURE CONTROL OF A SOLE STRUCTURE

CROSS REFERENCE TO RELATED APPLICATION

This application claims priority under 35 U.S.C. § 119(e) to Provisional U.S. Patent Application No. 62/552,964, filed Aug. 31, 2017, the disclosure of which is hereby incorporated by reference in its entirety

FIELD

The present disclosure relates generally to articles of footwear and more particularly to a sole structure for an article of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. Laces, straps, or other fasteners may cooperate with the upper to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber, composite, or other materials that impart durability and wear-resistance, as well as enhance stability and traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole and/or a sockliner located within a void proximate to the bottom portion of the upper.

Midsoles using polymer foam materials and cushioning inserts are generally configured to compresses resiliently under applied loads, such as during walking or running movements. Generally, midsoles are designed with an emphasis on balancing cushioning characteristics that relate to softness and responsiveness as the midsole compresses under gradient loads.

While suitable for providing support and cushioning, traditional insoles are not generally configured to accommodate other environmental factors that may affect comfort and long-term performance. For example, many ground-covering surfaces, such as asphalt and artificial grass, have a tendency to absorb relatively large amounts of solar radiation, which may lead to significant heating of the ground-covering surface. The elevated temperatures of these ground-covering surfaces may be transferred to a foot of a user through a sole structure of a shoe, thereby resulting in discomfort and fatigue.

DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
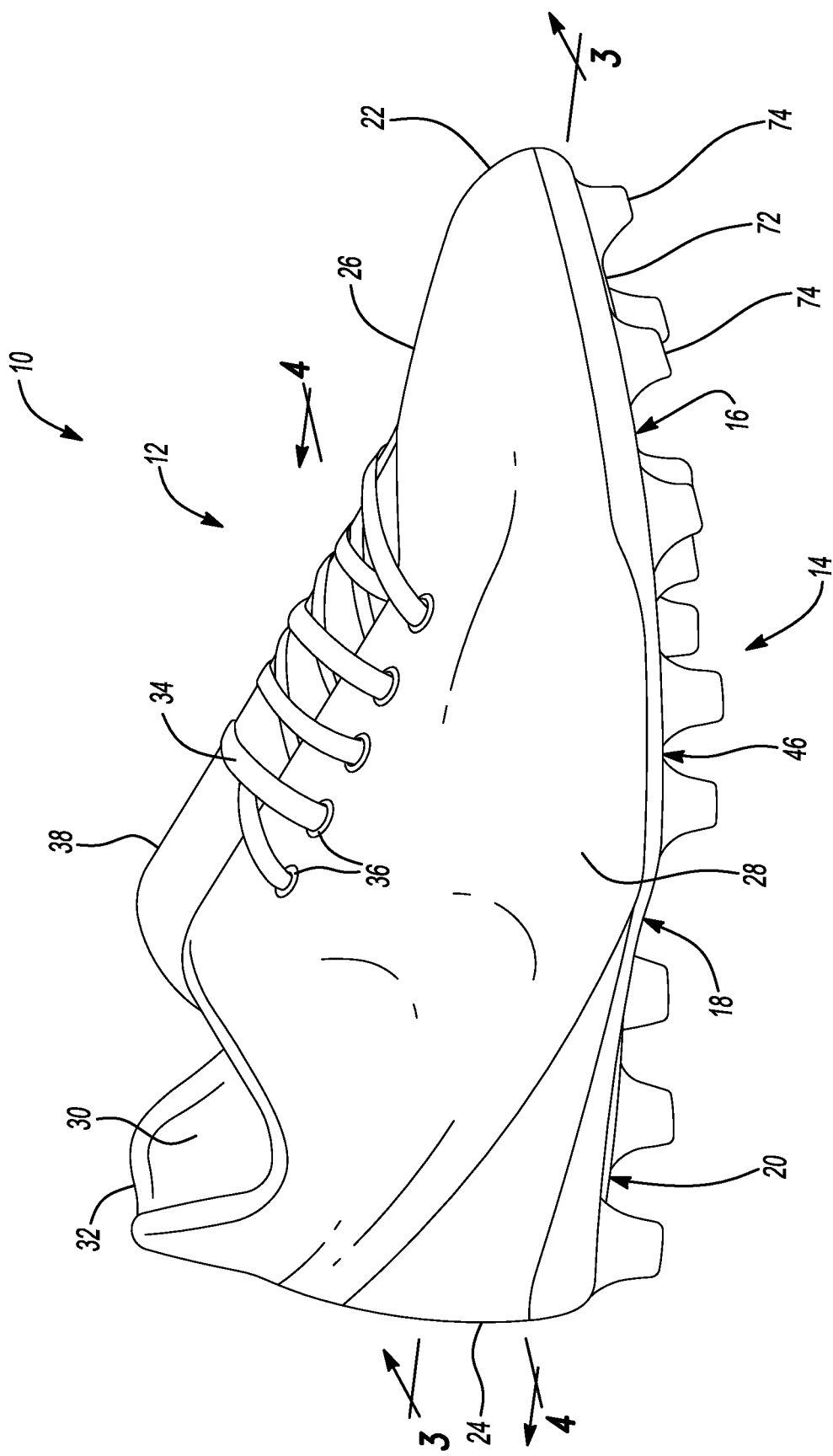
FIG. 1 is a perspective view of an article of footwear incorporating a sole structure in accordance with the principles of the present disclosure.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a sole structure for an article of footwear is provided. The sole structure includes a chamber having a first barrier element, a second barrier element, and a tensile member. The tensile member is disposed within an interior void defined by the first barrier element and the second barrier element. The sole structure further includes a phase change material disposed within the interior void and operable between a first state having a first viscosity and a second state having a second viscosity greater than the first viscosity.

In one configuration, the phase change material includes a first material and a second material different than the first material.

In some implementations, the tensile element includes a first tensile substrate, a second tensile substrate, and a plurality of tensile members extending between the first tensile substrate and the second tensile substrate. Further, the first tensile substrate may be attached to the first barrier element and the second tensile substrate may be attached to the second barrier element.

The sole may further include an insulating member disposed between the chamber and a ground-contacting surface. Further, the ground-contacting surface may be defined by an outsole of the sole structure. The outsole may include at least one ground-engaging member extending therefrom.

In some examples, the phase change material has a phase transition temperature above a normal skin temperature and below a pain threshold temperature. The phase change material may have a phase transition temperature ranging from 35° C. to 38° C.

The sole structure may be incorporated into an article of footwear having an upper.

In another configuration, a sole structure for an article of footwear is provided and includes a chamber, a tensile member, and a phase change material. The chamber defines an interior void. The tensile member is disposed within the interior void and is attached to opposing surfaces of the chamber. Likewise, the phase change material is disposed within the interior void and is operable between a first state in a first temperature range and a second state in a second temperature range.

The first temperature range may be from 30° C. to 35° C., and the second temperature range may be from 30° C. to 39° C. More particularly, the phase change material may have a transition temperature of 37° C.

In some configurations, the sole structure further includes an outsole defining a ground-contacting surface of the sole structure. The outsole may be formed of a rigid material and may include a plurality of ground-engaging members.

The sole structure may further include an insulating member disposed between the chamber and a ground-contacting surface. The insulating member may be formed of aerogel.

In yet another implementation, a sole structure for an article of footwear is provided and includes a chamber, an outsole, and an insulating member. The chamber defines an interior void having a phase change material and a tensile element disposed therein. The outsole defines a ground-contacting surface of the sole structure. The insulating member is disposed between the outsole and the chamber.

In some configurations of the sole structure, the phase change material has a phase transition temperature of 37° C. and the insulating member may be formed of aerogel.

With reference to FIGS. 1-4, an article of footwear 10 is provided and includes an upper 12 and a sole structure 14 attached to the upper 12. The article of footwear 10 may be divided into one or more regions. The regions may include a forefoot region 16, a midfoot region 18, and a heel region 20. The forefoot region 16 may correspond with toes and joints connecting metatarsal bones with phalanx bones of a foot, and may include an anterior end 22 of the article of footwear 10. The midfoot region 18 may correspond with an arch area of the foot while the heel region 20 may correspond with rear portions of the foot, including a calcaneus bone, and may include a posterior end 24 of the article of footwear 10. The article of footwear 10 may additionally include a medial side 26 and a lateral side 28 that correspond with opposite sides of the article of footwear 10 and extend through the regions 16, 18, 20.

The upper 12 includes interior surfaces that define an interior void 30 that receives and secures a foot for support on the sole structure 14. An ankle opening 32 in the heel region 20 may provide access to the interior void 30. For example, the ankle opening 32 may receive a foot to secure the foot within the void 30 and facilitate entry and removal of the foot from and to the interior void 30. In some examples, one or more fasteners 34 extend along the upper 12 to adjust a fit of the upper 12 around the foot while concurrently accommodating entry and removal of the foot therefrom. The upper 12 may include apertures 36 such as eyelets and/or other engagement features such as fabric or mesh loops that receive the fasteners 34. The fasteners 34 may include laces, straps, cords, hook-and-loop, or any other suitable type of fastener. The upper 12 may additionally include a tongue portion 38 that extends between the interior void 30 and the fasteners 34.

Optionally, the upper 12 may include a strobel 40 configured to enclose a bottom portion of the interior void 30. The strobel 40 may be joined to the upper 12 using stitching. In some examples, the strobel 40 may additionally or alternatively be adhesively bonded to the upper 12, and may include multiple layers of material.

The upper 12 may be formed from one or more materials that are stitched or adhesively bonded together to form the interior void 30. Suitable materials of the upper 12 may include, textiles, foam, leather, and synthetic leather. The materials may be selected and located to impart properties of durability, air-permeability, wear-resistance, flexibility, and comfort to the foot while disposed within the interior void 30.

The sole structure 14 is attached to the upper 12 and provides the article of footwear 10 with support and cushioning during use. Namely, the sole structure 14 attenuates ground-reaction forces caused by the article of footwear 10 striking the ground during use. Accordingly, and as set forth below, the sole structure 14 may incorporate one or more materials having energy absorbing characteristics to allow the sole structure 14 to minimize the impact experienced by a user when wearing the article of footwear 10. Additionally, the sole structure 14 is configured to mitigate thermal transfer from a ground-covering surface to the foot of a user, as set forth below.

The sole structure 14 may include different layers, such as a sockliner or insole 42, a midsole 44, and an outsole 46, for example. Each layer may serve a particular function. For example, the insole 42 may be designed to contact the foot to provide enhanced comfort to the foot, as described above. In this regard, the insole 42 may be disposed within the interior void 30. In the illustrated example, where the upper 12 includes the strobel 40, the insole 42 is formed separately from the midsole 44, and is disposed on an opposite side of the strobel 40 from the midsole 44. In other examples, where the upper 12 does not include the strobel 40, the insole 42 may include a layer formed into the sole structure 14, such that the insole 42 is disposed adjacent to the midsole 44 in an assembled configuration. A material, or combination of materials, of the insole 42 may be selected to impart properties of cushioning, stability, ventilation, and breathability.

Figure 2:
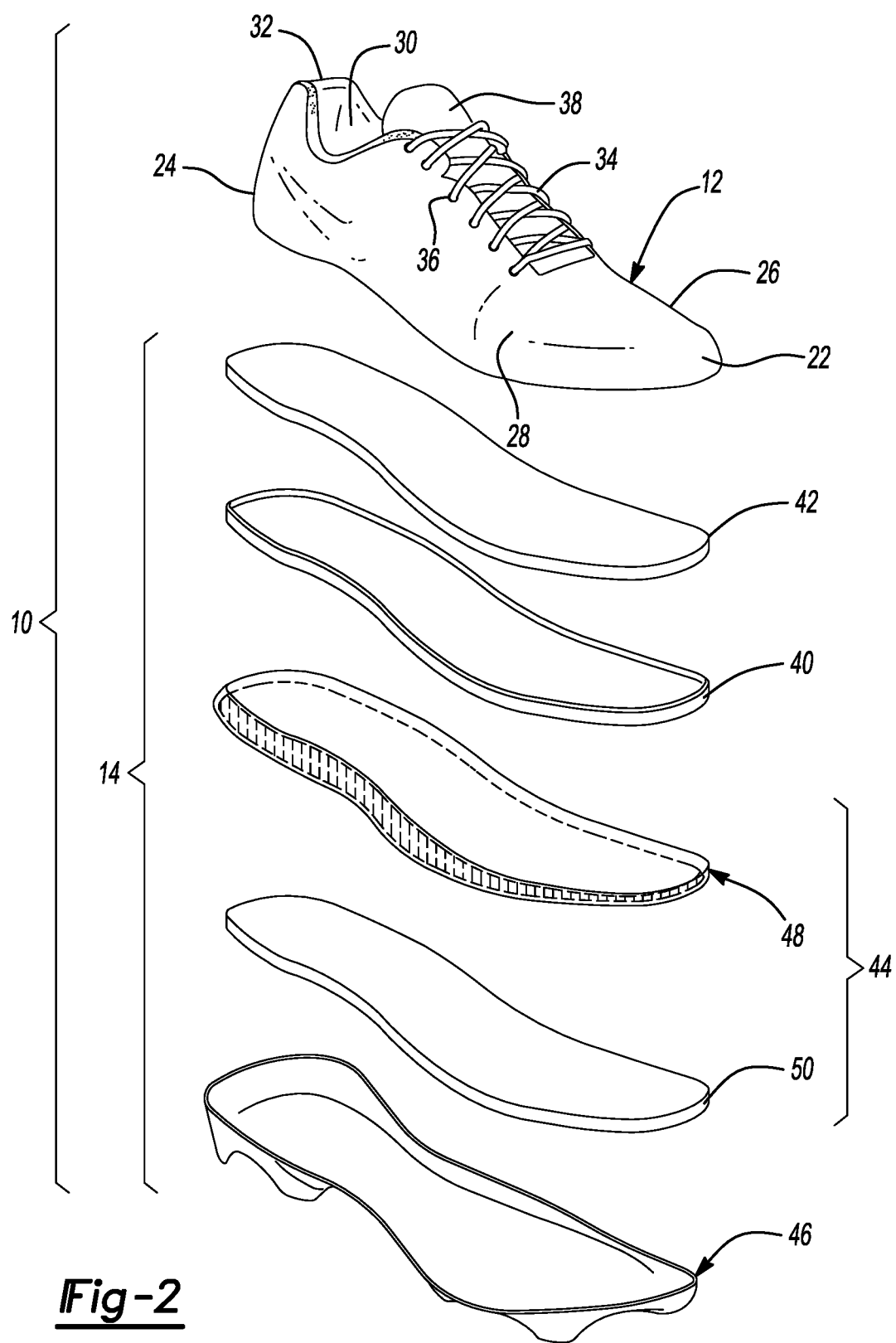
FIG. 2 is an exploded view of the article of footwear of FIG. 1.
Figure 3:
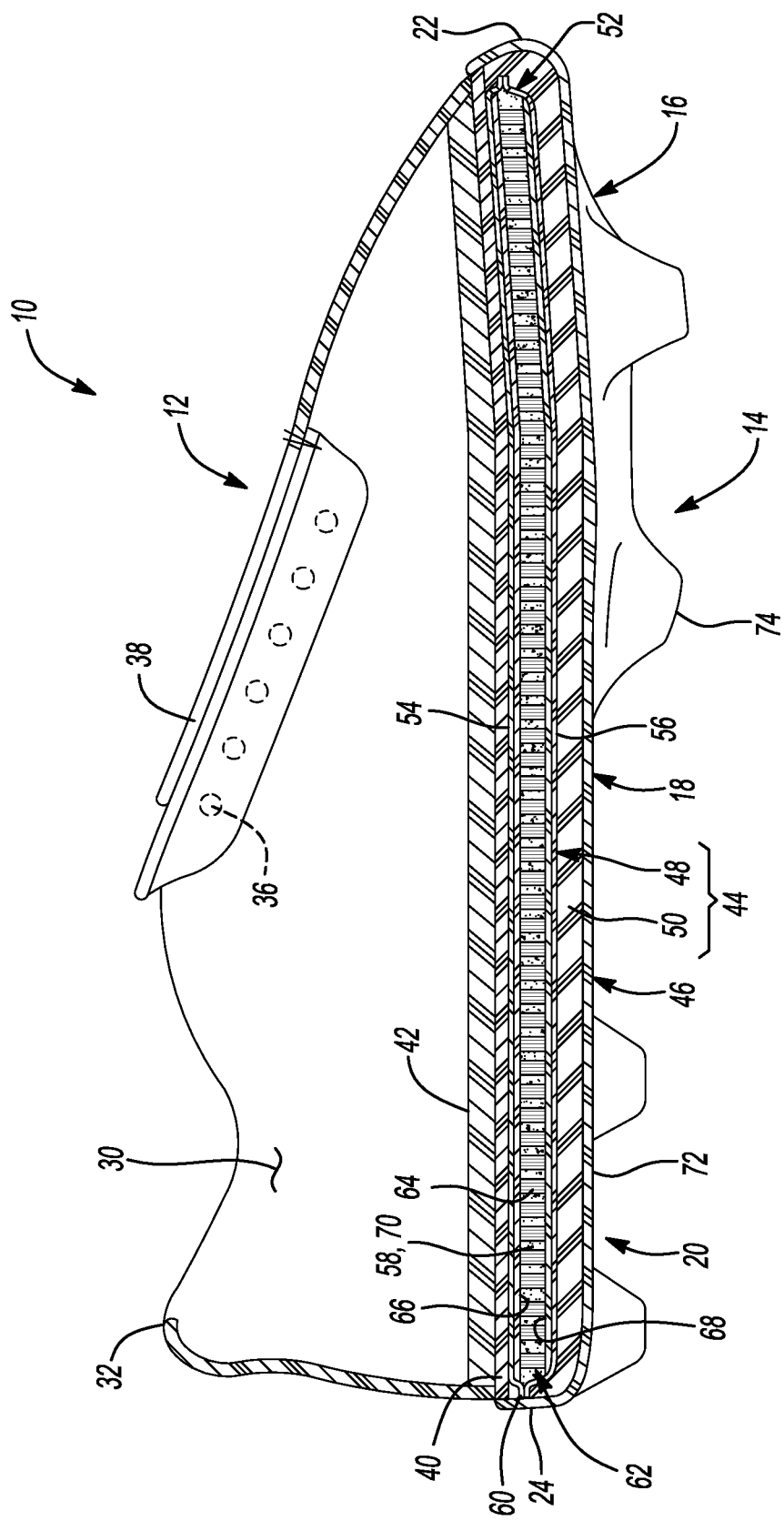
FIG. 3 is a cross-sectional view of the article of footwear of FIG. 1 taken along Line 3-3 of FIG. 1.
Figure 4:
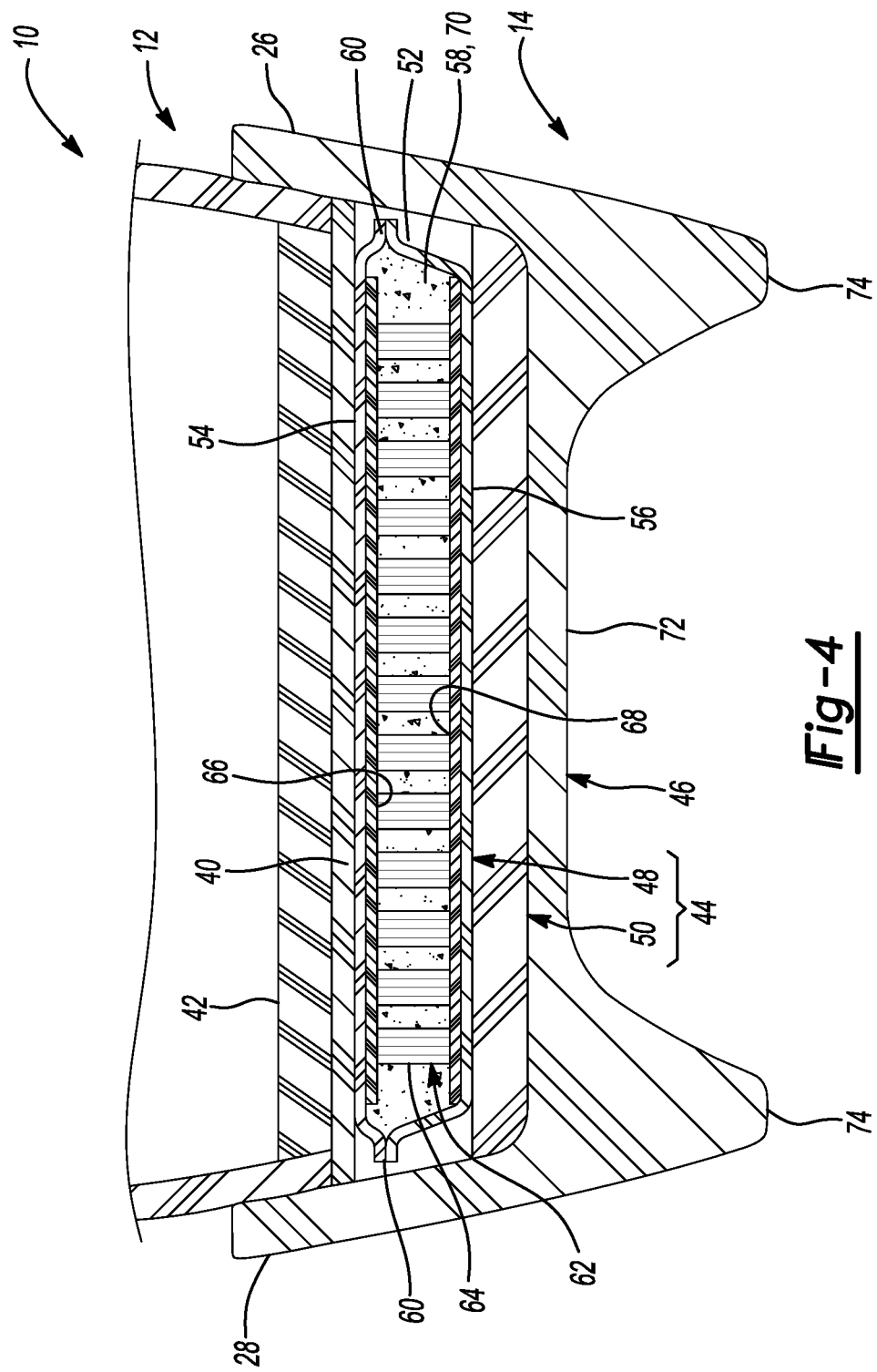
FIG. 4 is a cross-sectional view of the article of footwear of FIG. 1 taken along Line 4-4 of FIG. 1.

With continued reference to FIGS. 2-4, the midsole 44 is disposed intermediate the insole 42 and the outsole 46. As shown, the midsole 44 opposes the strobel 40, and is disposed intermediate the strobel 40 and the outsole 46. However, as discussed above, the strobel 40 may not be included in some configurations, and the midsole 44 may be disposed directly intermediate the insole 42 and the outsole 46. The midsole 44 is shown as extending from the anterior end 22 of the article of footwear 10 to the posterior end 24, and spans a width of the article of footwear 10 from the medial side 26 to the lateral side 28.

The midsole 44 includes a cushioning member 48 and an insulating member 50. Optionally, the midsole 44 may include a plate member (not shown) disposed above, below, or within the midsole, and configured to provide a desired level of stiffness or resiliency to the midsole 44.

As shown in FIGS. 3 and 4, the cushioning member 48 includes a fluid-filled chamber 52 disposed generally between the upper 12 and the insulating member 50. Specifically, the fluid-filled chamber 52 is attached to the strobel 40 at a first side, and is attached to the insulating member 50 at a second side. Alternatively, where no strobel is included, the first side of the fluid-filled chamber 52 may be attached to or may be in contact with the insole 42. The fluid-filled chamber 52 may be attached to the insulating member 50 and/or the upper 12 via a suitable adhesive, stitching, and/or melding.

The fluid-filled chamber 52 may include a first barrier element 54 and a second barrier element 56. The first barrier element 54 may be formed from a sheet of thermoplastic polyurethane (TPU). Specifically, the first barrier element 54 may be formed from a sheet of TPU material and may include a substantially planar shape. The second barrier element 56 may likewise be formed from a sheet of TPU material and may be formed into the configuration shown in FIGS. 3 and 4 to define an interior void 58 of the fluid-filled chamber 52. The first barrier element 54 may be joined to the second barrier element 56 by applying heat and pressure at a perimeter of the first barrier element 54 and the second barrier element 56 to define a peripheral seam 60. The peripheral seam 60 seals the internal interior void 58, thereby defining a volume of the fluid-filled chamber 52.

The interior void 58 of the fluid-filled chamber 52 may receive a tensile element 62 therein. The tensile element 62 may include a series of tensile members 64 extending between an upper tensile substrate 66 and a lower tensile substrate 68. The upper tensile substrate 66 may be attached to the first barrier element 54 while the lower tensile substrate 68 may be attached to the second barrier element 56. In this manner, when the fluid-filled chamber 52 receives a pressurized fluid 70, the tensile members 64 of the tensile element 62 are placed in tension. Because the upper tensile substrate 66 is attached to the first barrier element 54 and the lower tensile substrate 68 is attached to the second barrier element 56, the tensile members 64 retain a desired shape of the fluid-filled chamber 52 when the pressurized fluid 70 is injected into the interior void 58.

The pressurized fluid 70 is enclosed within the interior void 58 of the fluid-filled chamber 52, and is configured to absorb and release thermal energy. In some examples, the pressurized fluid 70 is a phase change material 70 operable between a first phase having a first viscosity (e.g., a solid state), and a second phase having a second viscosity (e.g., a liquid state). Particularly, the phase change material 70 is configured to cyclically absorb and release thermal energy to attenuate temperature changes of the foot during periods of elevated physical activity and/or high surface temperatures. For example, a temperature of the phase change material 70 may increase until a phase transition temperature is reached, at which point the phase change material 70 transitions from the first phase to the second phase. During the transition, the temperature of the phase change material remains relatively constant, while thermal energy continues to be absorbed in the form of latent heat. Once the phase change material 70 is fully transitioned to the second, liquid state, additional thermal energy is absorbed as sensible heat, causing an increase in temperature, as discussed in detail below. The phase change material 70 is returned to the first, solid state by releasing the stored thermal energy.

In some configurations of the cushioning member 48, the phase change material 70 may be selected to operate in a buffer mode during use of the article of footwear 10, such that the phase change material 70 transitions between the first phase and the second phase to dampen temperature fluctuations. Particularly, the phase change material 70 may be selected based on maintaining a temperature of the foot within a desired range of temperatures to maximize comfort while prolonging thermal energy absorption. For example, it is generally accepted that normal skin temperatures are in the range of 30° C. to 35° C. for feet. See Olesen, Bjarne W. "Thermal comfort." *Technical review* 2 (1982): 3-37. However, during periods of increased physical activity, particularly on ground surfaces having temperatures above ambient temperatures, temperatures of the foot may exceed this normal temperature range. For example, testing conducted by applicant showed that skin temperatures in the range of 37° C. to 43° C. may be commonly experienced using traditional articles of footwear. Testing further established that a user may experience discomfort, and even pain, at skin temperatures at or above 38.5° C. to 40° C. Accordingly, a phase change material configured to maintain the temperature of the foot in the range of 30° C. to 38.5° C. is desirable.

Initially, it appears desirable to select a phase change material 70 having a phase transition temperature below or within the normal temperature range (30° C.-35° C.) of the foot in order to maintain the temperature of the foot within the most comfortable temperature range. However, because the temperature of the foot is generally within this range prior to any physical activity, the thermal absorption capacity of the phase change material 70 is typically depleted relatively quickly, and little benefit is provided beyond an initial cooling sensation. Unexpectedly, testing conducted by applicant showed that selecting a phase change material 70 having a phase transition temperature between the normal temperature range (30° C.-35° C.) and the pain threshold temperature (38.5° C.-40° C.) provided maximized thermal energy absorption, and maintained skin temperatures at the bottom of the foot at temperatures below the pain threshold temperature range for a maximized period of time.

Based on the foregoing, the phase change material 70 of the fluid-filled chamber 52 is selected to have a transition temperature ranging from 30° C. to 42° C., more preferably from 30° C. to 39° C., even more preferably from 35° C. to 38° C., and most preferably 37° C. One suitable phase change material 70 is PureTemp® 37 manufactured by Entropy Solutions, which has a phase transition temperature of 37° C.

Figure 5:
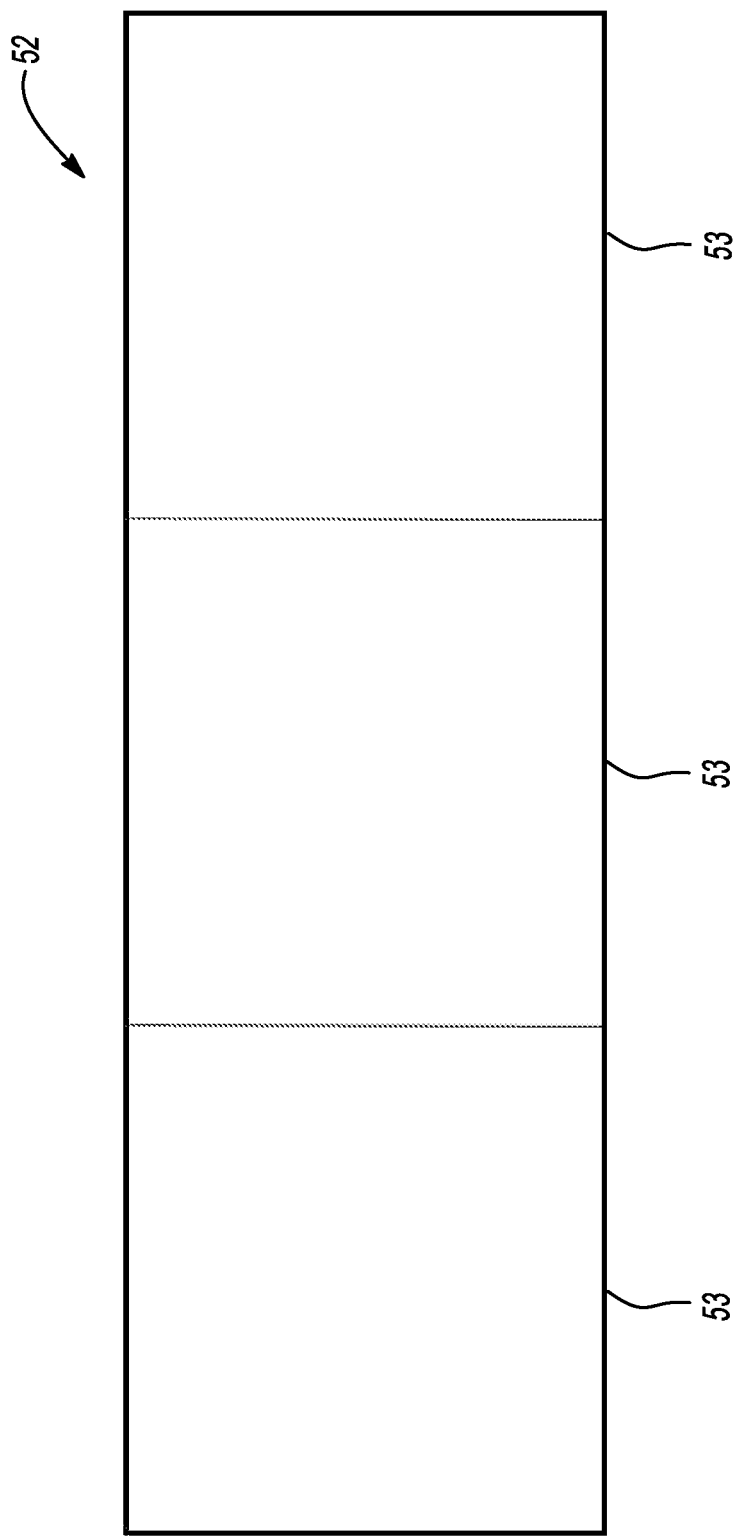
FIG. 5 is an example of a fluid-filled chamber in accordance with the principles of the present disclosure.

In some examples, as shown in FIG. 5, the phase change material 70 may include a combination of phase change materials 70. For example, the fluid-filled chamber 52 may be compartmentalized by joining the first barrier element 54 to the second barrier element 56 in intermediate portions of the fluid-filled chamber 52. Additionally or alternatively, compartments may be formed by providing a plurality of separately formed fluid-filled chambers 52. A first compartment 53 may be provided with a first phase change material 70 and a separate compartment 53 may be provided with a second phase change material 70. For example, a first compartment 53 may be formed in the forefoot region 16 of the cushioning member 48 including the first phase change material 70 while a second compartment 53 may be formed in the midfoot region 18 and/or the heel region 20 including a second phase change material 70. Furthermore, the cushioning member 48 may include a layered configuration, wherein a first fluid-filled chamber 52 including a first phase change material 70 is stacked on a second fluid-filled chamber 52 having a second phase change material 70. The respective first and second phase change materials 70 may be selected based on a desired amount of thermal energy absorption in each of the regions 16, 18, 20 and/or layers.

The insulating member 50 is disposed intermediate the fluid-filled chamber 52 of the cushioning member 48 and the outsole 46, and is configured to mitigate the transfer of thermal energy from the outsole 46 to the cushioning member 48, thereby further minimizing the transfer of thermal energy from the ground surface to the foot. A material of the insulating member 50 is selected to minimize conduction between the outsole 46 and the cushioning member 48. In some examples, the insulating member 50 is formed of an aerogel material.

In the illustrated example, the insulating member 50 is continuously formed, and spans an entirety of the midsole 44. However, in some examples, the insulating member 50 may span only a portion of the midsole 44, or may be fragmentary. For example, the insulating member 50 may not extend into one of the regions 16, 18, 20, or may include a first fragment formed in a first one of the regions 16, 18, 20 and a second fragment formed in a second one of the regions 16, 18, 20. Additionally or alternatively, the insulating member 50 may include a plurality of layers and/or segments formed of different materials.

Further, although the insulating member 50 is shown in FIGS. 2 and 4 as being a substantially planar body disposed beneath the cushioning member 48, the insulating member 50 may include a profiled upper surface configured to receive at least a portion of the cushioning member 48 therein. For example, as shown in FIG. 3, the cushioning member 48 may be disposed within the insulating member 50 such that a top surface of the cushioning member 48 and a top surface of the insulating member 50 are substantially flush. As such, the insulating member 50 may accommodate an outer shape of the cushioning member 48 and provide a desired fit between the midsole 44 and the outsole 46, particularly when the midsole 44 is received within the outsole 46.

The outsole 46 is disposed at the bottom of the article of footwear 10, and defines a ground-contacting surface 72. Generally, the outsole 46 is formed of a material or combination of materials that provide abrasion-resistance and durability, and enhances traction with the ground surface. In some examples, the outsole 46 is formed of a rigid material, such as a polymer or composite, and imparts rigidity on the sole structure 14. The outsole 46 may extend upwardly onto an outer surface of the upper 12, thereby encapsulating the midsole 44 between the outsole 46 and the upper 12. The outsole 46 may further include a plurality of ground-engaging members 74 configured to engage a ground surface during use. In some examples, the outsole 46 may be a rubber layer having a relatively high coefficient of friction for providing traction on a smooth, hard playing surface, such as a tennis or basketball court.

During use, the article of footwear 10 is initially provided to the foot at a first temperature below a predetermined phase transition temperature of phase change material 70. For example, the article of footwear 10 may be stored in an ambient environment prior to use. Alternatively, the article of footwear 10 may be cooled to a minimum temperature level within a comfortable range of temperatures. During periods of low physical activity within an ambient environment, the phase change material 70 is configured to remain below the phase transition temperature, whereby the phase change material 70 remains in a solid state. For example, when a phase change material 70 having a phase transition temperature of 37° C. is selected the phase change material 70 will remain in the solid state so long as the foot stays within the normal temperature range of 30° C.-35° C.

In some examples, the article of footwear 10 may be used on a ground surface having a temperature well in excess of the phase transition temperature. For example, during testing it was common for temperatures of artificial turf to exceed 60° C. under sunny, but cool conditions. In these cases, thermal energy from the ground surface may be conducted to the article of footwear 10 by the outsole 46. The outsole 46 is insulated from the upper 12 by the insulating member 50, which minimizes the transfer of thermal energy to the foot. However, thermal energy passing through the insulating member 50 is absorbed by the cushioning member 48, and more particularly, by the phase change material 70 within the fluid-filled chamber 52. Initially, the thermal energy is absorbed by the phase change material 70 as sensible heat, and a temperature of the phase change material increases from the first temperature to the phase transition temperature.

Once the phase transition temperature is achieved, the phase change material 70 absorbs the thermal energy as latent heat, whereby the temperature of the phase change material 70 remains substantially constant at the phase transition temperature, and the phase change material 70 transitions from a first, solid state, to a second, liquid state. The temperature will remain constant until the phase change material 70 has transitioned entirely, at which point the thermal energy will continue to be absorbed as sensible heat, and the temperature of the phase change material will increase. The time required for the phase change material 70 to transition entirely is dependent on a temperature of the ground surface and a skin temperature of the foot as well as a configuration and volume of the phase change material 70.

During testing, it was discovered that inclusion of the phase change material 70 within the midsole 44 maintained temperatures of the foot below the pain threshold for at least three times longer than conventional midsoles. For example, in tests carried out on an artificial turf playing surface having a temperature of 65° C., a midsole 44 having a phase change material 70 according to the instant disclosure maintained temperatures below 37° C. for up to 45 minutes, while a midsole without the phase change material 70 exceeded 37° C. in less than 15 minutes. Accordingly, the use of a phase change material 70 in combination with the fluid-filled chamber 52 of the instant disclosure advantageously maintains foot temperatures below a pain threshold for at least one half of most commonly-played sports, thereby allowing an article of footwear 10 having a depleted phase change material 70 to be replaced at halftime with new article of footwear 10 having the phase change material 70 in the first, solid state.

The foregoing article of footwear 10 incorporates a sole structure 14 that provides a degree of cushioning and thermal management to a foot of a user during use of the particular article of footwear 10. Accordingly, the articles of footwear 10 may be used for a variety of athletic activities such as soccer, running, tennis, basketball, or the like.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A midsole for an article of footwear, the midsole comprising:
   a chamber including a first compartment separated from a second compartment, each of the first compartment and the second compartment including a first barrier element, a second barrier element, and a tensile element disposed within an interior void defined by the first barrier element and the second barrier element; and
   a phase change material disposed within each interior void and operable between a first state having a first viscosity and a second state having a second viscosity greater than the first viscosity, the phase change material includes a first material and a second material, the second material having a phase transition temperature different than the first material, the first material entirely disposed in the first compartment and the second material entirely disposed in the second compartment.

2. The midsole of claim 1, wherein the each tensile element includes a first tensile substrate, a second tensile substrate, and a plurality of tensile members extending between the first tensile substrate and the second tensile substrate.

3. The midsole of claim 2, wherein, in each tensile element, the first tensile substrate is attached to the respective first barrier element and the second tensile substrate is attached to the respective second barrier element.

4. The midsole structure of claim 1, further comprising an insulating member and an outsole, the outsole forming a ground-contactable surface, the insulating member disposed between the chamber and the outsole.

5. The midsole of claim 4, wherein the outsole includes at least one ground-engageable member.

6. The midsole of claim 1, wherein at least one of the first material and the second material of the phase change material has a phase transition temperature above 35° C.

7. The midsole of claim 1, wherein at least one of the first material and the second material of the phase change material has a phase transition temperature ranging from 35° C. to 38° C.

8. An article of footwear incorporating the midsole of claim 1.

9. A midsole for an article of footwear, the midsole comprising:
   a chamber having a first compartment separated from a second compartment, each of the first compartment and the second compartment defining a respective interior void;
   a respective tensile member disposed within each interior void, each tensile member respectively attached to opposing surfaces of the first compartment and second compartment of the chamber; and
   a phase change material including a first material and a second material, the first material entirely disposed within the interior void of the first compartment and the second material entirely disposed within the interior void of the second compartment, each of the first material and the second material being operable between a first state in a first temperature range and a second state in a second temperature range, the first temperature range and the second temperature range of the first material being different than the first temperature range and the second temperature range of the second material, respectively.

10. The midsole of claim 9, wherein at least one of the first temperature ranges is from 30° C. to 35° C.

11. The midsole of claim 10, wherein at least one of the second temperature ranges is from 35° C. to 42° C.

12. The midsole of claim 9, wherein one of the first material and the second material of the phase change material has a phase transition temperature of 37° C.

13. The midsole of claim 9, further comprising an outsole defining a ground-contactable surface of the midsole, the outsole formed of a rigid material and including a plurality of ground-engageable members.

14. The midsole of claim 9, further comprising an insulating member disposed between the chamber and a ground-contactable surface of the midsole.

15. The midsole of claim 14, wherein the insulating member is formed of aerogel.

16. A midsole for an article of footwear, the midsole comprising:

a chamber having a first compartment separated from a second compartment, each of the first compartment and the second compartment defining a respective interior void, the first compartment including a first phase change material and the second compartment including a second phase change material that is different from the first phase change material, and a respective tensile element disposed within the interior void of the first compartment and within the interior void of the second compartment, wherein the first phase change material and the second phase change material are operable between a first state in a first temperature range and a second state in a second temperature range, the first temperature range being different than the second temperature range;

an outsole defining a ground-contactable surface; and an insulating member disposed between the outsole and the chamber.

17. The midsole of claim 16, wherein at least one of the first phase change material and the second phase change material has a phase transition temperature of 37° C.

\* \* \* \* \*